United States Patent [19]

Nekomoto

[11] Patent Number: 5,544,041
[45] Date of Patent: Aug. 6, 1996

[54] TIME-DEPENDENT DATA CONTROL SYSTEM

[75] Inventor: Yoshihiko Nekomoto, Isehara, Japan

[73] Assignee: NCR Corporation, Dayton, Ohio

[21] Appl. No.: 387,962

[22] Filed: Feb. 10, 1995

Related U.S. Application Data

[63] Continuation of Ser. No. 988,654, Dec. 10, 1992, abandoned.

[30] Foreign Application Priority Data

Dec. 10, 1991 [JP] Japan .................................. 3-349796

[51] Int. Cl.⁶ ................................................ G06F 17/60
[52] U.S. Cl. .................... 364/401 R; 235/383; 364/405
[58] Field of Search .................................. 364/401, 403, 364/405, 464.01, 464.04; 235/383, 385; 340/825.35

[56] References Cited

U.S. PATENT DOCUMENTS

| | | | |
|---|---|---|---|
| 4,398,250 | 8/1983 | Hosono | 364/404 |
| 4,500,880 | 2/1985 | Gomersall et al. | 340/825.35 |
| 4,750,120 | 6/1988 | Takahashi | 364/405 |
| 4,766,295 | 8/1988 | Davis et al. | 235/383 |
| 4,887,209 | 12/1989 | Sugishima | 364/405 |
| 4,888,709 | 12/1989 | Revesz et al. | |
| 4,908,769 | 3/1990 | Vaughan et al. | 364/464.04 |
| 5,111,196 | 5/1992 | Hunt | 340/825.35 |
| 5,172,314 | 12/1992 | Poland et al. | 364/401 |
| 5,198,644 | 3/1993 | Pfeiffer et al. | 235/383 |

FOREIGN PATENT DOCUMENTS

| | | |
|---|---|---|
| 57-86974 | 5/1982 | Japan . |
| 57-105076 | 6/1982 | Japan . |
| 58-29065 | 2/1983 | Japan . |

Primary Examiner—Robert A. Weinhardt
Attorney, Agent, or Firm—Craig E. Miller

[57] ABSTRACT

A time-dependent data control system which includes a control unit capable of transmitting data to a plurality of terminals. Each of the terminals is in communication with and receives transmissions of data such as "changed data" and "change time" from the control unit. Each of the terminals further include a clock capable of comparing the "change time" data received from the control unit with the current time and, once the change time transmitted by the control unit occurs, displaying the changed data received from the control unit. Thus, individual terminals change their display contents independently of each other based upon the data received from the control unit and are capable of changing the display contents simultaneously, or at a predetermined number of preset times. In addition, the terminals are placed in a standby rest mode to reduce the energy requirements and power consumption and can be brought into an enabling mode upon transmission of a data start signal transmitted by the control unit.

15 Claims, 3 Drawing Sheets

| DISPLAY ADDRESS | DISPLAY CHANGE TIME DATA | CHANGED DATA | STANDARD TIME DATA |

TIME-DEPENDENT DATA CONTROL SYSTEM

This is a continuation of application Ser. No. 07/988,654, filed Dec. 10, 1992 now abandoned.

BACKGROUND AND SUMMARY OF THE INVENTION

The present invention relates generally to new and novel improvements in time-dependent data control systems. More particularly, the present invention relates to data control systems which allow data to be transmitted from a control unit to a plurality of individual terminals such that each individual terminal can begin using the data thus transmitted independently of the other terminals either at a single preset time or at a predetermined number of preset times.

In many conventional data control systems, data is transmitted from a control unit to a plurality of terminals and the individual terminals begin using the information transmitted from the control unit immediately upon receipt of the data. However, in these conventional systems, unless relatively expensive high speed data communication equipment is used or the number of individual terminals is small, differences in the data receiving time among individual terminals can be significant. Hence, the time at which the processing is started in accordance with the changed data can significantly differ among the different terminals.

Such variations in the time the terminals begin using the transmitted changed data as described above is undesirable in many data processing applications. For example, in the case of a merchandise article price display system or the like such as that used in supermarkets and other large retail stores, the possibility exists that the same merchandise articles could have different prices displayed at the same time at different display locations within the store if multiple price displays are used. The purpose of such a merchandise article price display system is to inform customers of current price information. Therefore, erroneous displays of the current price can cause customer confusion and ill will. Furthermore, since in typical merchandise article price display systems used in supermarkets and large retail stores many individual price displays are utilized, it is often undesirable to utilize high speed data communication equipment due to its complexity and cost.

A representative calculation of the communication time needed for changing price information in such conventional price display systems will now be described. Assuming that the number of price displays installed is 1,000, the data communication speed is 1,200 bits per second (BPS) with an execution efficiency of 70% and that the data length is 40 bytes, it will take eight minutes from the start of data transmission to the individual price displays until the last price display is changed. This means that price displays for the same merchandise articles can display different price information for up to eight minutes. It will be recognized that this time delay will increase as the number of individual price displays is increased, and supermarkets and other large retail stores often utilize 20,000 or more individual price displays.

Accordingly, an object of the present invention is to provide a time-dependent data control system where data is transmitted from a control unit to a plurality of terminals and each individual terminal can begin utilizing the data transmitted at a predetermined time after the transmission of data has occurred.

Another object of the present invention is to provide a time-dependent data control system where data is transmitted from a control unit to a plurality of terminals and each of the plurality of terminals can begin utilizing the data transmitted simultaneously at a predetermined time after the transmission of data has occurred.

A further object of the present invention is to provide a time-dependent data control system having a control unit and a plurality of terminals with clock means such that the times of the clock means of all of the individual terminals can be set upon reception of the data from the control unit.

Yet another object of the present invention is to provide a time-dependent data control system having a control unit and a plurality of terminals with clock means and the terminals are adapted to automatically change the displayed data in the individual terminals to the transmitted changed data at a preset change time.

Still a further object of the present invention is to provide a time-dependent data control system having a control unit and a plurality of terminals in which the energy requirements and power consumption of the individual terminals are minimized.

These and other objects of the present invention are attained by the provision of a time-dependent data control system having a control unit and a plurality of price display terminals where changed data and change time are transmitted from the control unit to each price display terminal prior to the time at which the individual price display terminal is to utilize the changed data. Once the data is transmitted from the control unit to each price display terminal, the price display terminal compares the current time with the change time by clock means installed within the price display terminal. The individual price display terminal will then utilize the transmitted changed data to change the price display when the change time has come.

The control unit also includes provisions such that when the change time is transmitted to each price display terminal, the time data in a clock means installed in the control unit is transmitted to the price display terminals as a reference time. This permits each price display terminal to set the time in its internal clock means to the reference time transmitted from the control unit. Thus, the clock means of each price display terminal is periodically adjusted to correspond with the reference time present in the control unit clock means.

When transmission of data from the control unit to the price display terminals is to be started, a start of transmission signal of a given length is transmitted to each price display terminal in such a manner that each price display terminal will switch from a standby rest mode into an enable period. This minimizes the energy requirements and power consumption of the individual price display terminals.

Other objects, advantages and novel features of the present invention will become apparent in the following detailed description of the invention when considered in conjunction with the accompanying drawings.

DETAILED DESCRIPTION OF THE DRAWINGS

Figure 1:
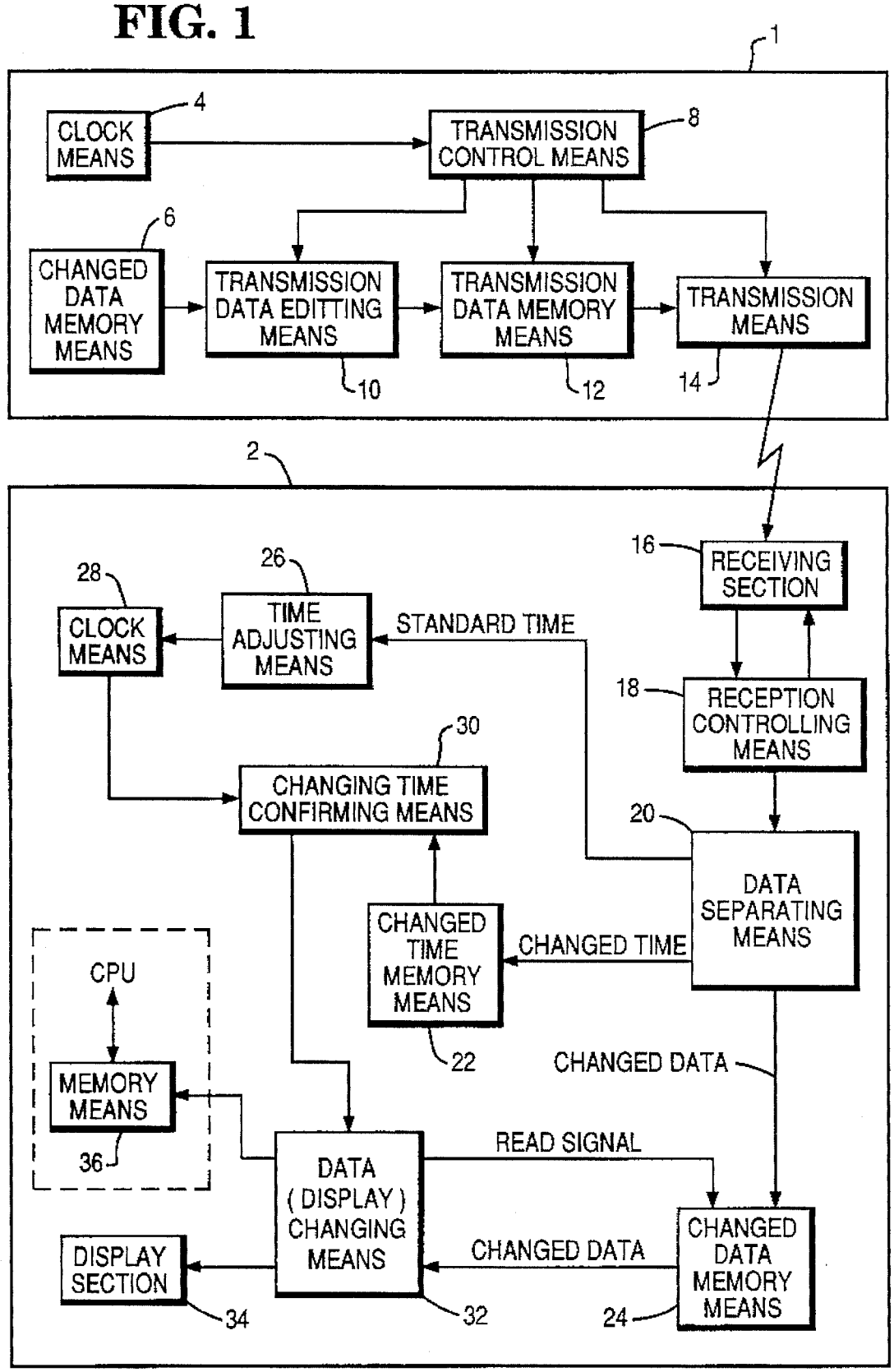
FIG. 1, which illustrates a preferred embodiment of a time-dependent data control system in accordance with the present invention, is a block diagram schematically showing the structure of the control unit and a representative price display terminal in the time-dependent data control system of the present invention.

Referring now to the drawings, in which like-referenced characters indicate corresponding elements throughout the several views, attention is first directed to FIG. 1 which illustrates a block diagram of a preferred embodiment of the time-dependent data control system in accordance with the present invention. As seen in FIG. 1, the time-dependent data control system generally includes control unit 1 and a plurality of terminals, a representative terminal being identified by reference numeral 2. It is to be noted that the present invention will be described on the assumption that control unit 1 is a central processing unit such as a store controller or the like and terminal 2 is a price display terminal.

Control unit 1 includes changed data memory means 6 for storing in advance the change time and the changed data which will be transmitted to price display terminal 2. Transmission control means 8 compares the change time stored in changed data memory means 6 with the time present in clock means 4 to permit editing of the changed data to be transmitted before the time at which the changed data is to be transmitted. The transmitted changed data thus edited is stored in transmission data memory means 12. The time at which the changed data editing is started and the time at which the changed data or the like is to be transmitted are determined based on the time required for editing, the time required for transmitting changed data to all of the price display terminals and the time at which the changed data is to be displayed.

When the time determined by transmission data editing means 10 or the transmission time which is programmed in advance has come, transmission control means 8 controls transmitting means to transmit the transmission data stored in transmission data memory means 12 to each price display terminal. The order in which the changed data is transmitted to all of the price display terminals is determined in advance. The order of data transmission, the time required for transmitting the changed data to each of the price display terminals, the time required for editing and the like are stored in advance in changed data memory means 6, transmission control means 8 and other appropriate memory means. The changed data transmitted from control unit 1 is then sequentially received by the individual price display terminals.

Figures 2, 3:
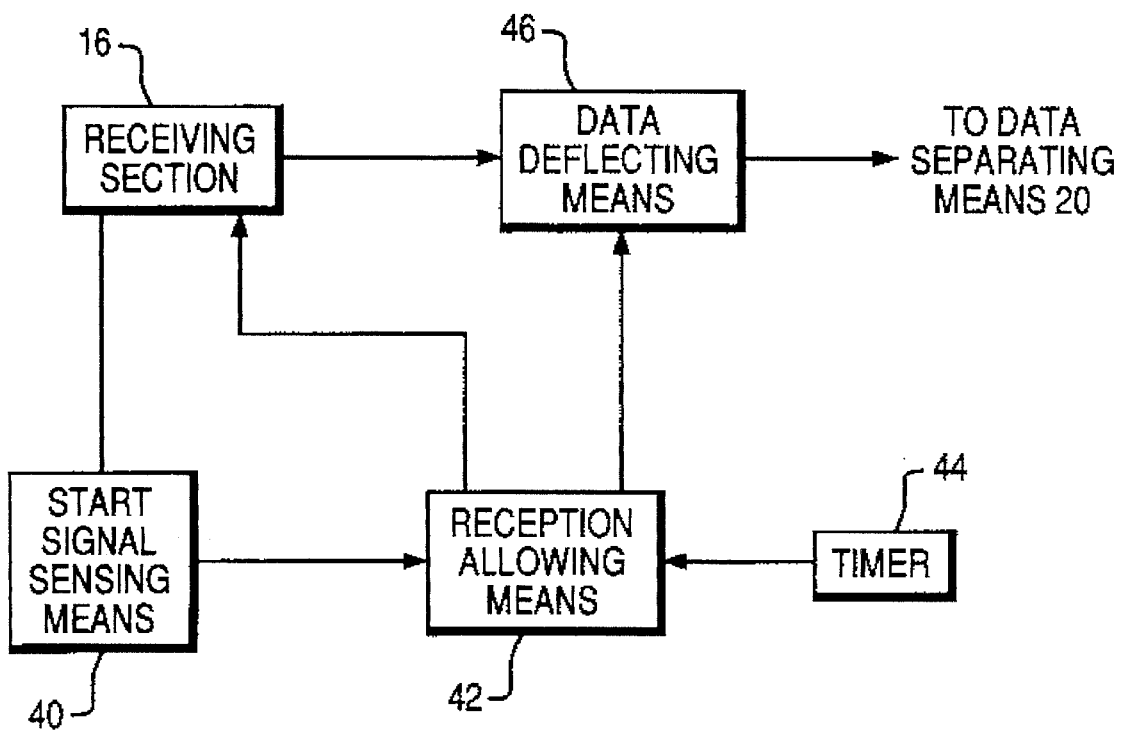
FIG. 2 is a block diagram of a preferred embodiment of the grouping of data transmitted from the control unit to the price display terminals in accordance with the time-dependent data control system of the present invention.
FIG. 3 is a block diagram of a preferred embodiment of the receiving section of a representative price display terminal in accordance with the time-dependent data control system of the present invention.

FIG. 2 shows an example of the grouping of data transmitted from control unit 1. This data is broadly divided into three kinds of data, that is, "display change time data", "changed data" and "standard time data". It will be recognized that other data could be included in this grouping as required. Furthermore, in the case that there is no need to adjust the time of the clock means of the price display terminals, the "standard time data" portion could be omitted. Conversely, since the "standard time data" is commonly used by all of the price display terminals, the "standard time" could be transmitted simultaneously to all of the price display terminals before or after the transmission of the other discrete data (the display change time data and changed data).

Price display terminal 2 includes individual sections 16, 18 and the like relating to the data communication, display section 34, data (display) changing means 32, changed data memory means 24, clock means 28, time adjusting means 26, changed time memory means 22 and the like. The data received by receiving section 16 of price display terminal 2 is transmitted to reception controlling means 18. The data is then separated by data separating means 20 to "display change time" which is stored in changed time memory means 22 and the "changed data" is stored in changed data memory means 24. The "standard time" is transmitted to time adjusting means 26, by which the time of clock means 28 is adjusted to be set to the standard time.

Thus, the processing operation performed immediately after the reception of changed data and the like by price display terminal 2 is completed. Control unit 1 transmits the required data as mentioned above to each of the price display terminals of which price data is to be changed in the store and the individual price display terminals perform the above mentioned processing operations in accordance with the data received. The data transmission and reception relating to the display change is performed with enough time to spare such that the data transmission to all of the price display terminals concerned may be completed by the time the particular price display terminals are to be changed.

Next, the processing operations performed by price display terminal 2 after reception of the changed data until the change of display will be described. When the change time is stored in changed time memory means 22, changing time confirming means 30 periodically compares the change time stored in changed time memory means 22 with the current time output from clock means 28. If these times coincide with each other, a change indication signal is transmitted to data (display) changing means 32. Data (display) changing means 32 receives the change indication signal and reads out the changed data from changed data memory means 24 to change the data which is being displayed on display section 34 to the changed data. In the case where the present invention is applied to other systems, the contents stored in memory means 36 may be changed instead of the change of contents displayed on display section 34 as shown by the part surrounded by a dotted line in FIG. 1.

As has been described above, the individual price display terminals change the contents displayed thereon independently of one another at the preset change time. In addition, each of the price display terminals is capable of adjusting its clock means such that the time of the clock means is set to the standard time of the store controller. Thus, variations of time between the clock means of the individual price display terminals is minimized. Accordingly, if desired, the displayed data on all of the individual price display terminals which are to be changed can be changed together at the change time instructed by control unit 1. In this manner, the displayed contents on the individual price display terminals to be changed can be changed independently and simultaneously at the time designated by the store controller.

In many price display systems, the life of the power source in the price display terminals can present difficulties. Since price display terminals are typically attached onto a showcase in the store, the price display terminals are often subject to water, moisture, vibration and other environmental conditions. Under these circumstances, if electric connections are made by conventional physical contact in order to send a signal from the store controller to the price display terminal or to supply power thereto from the outside, poor electrical contact can be encountered. In addition, since it is often necessary to frequently change the attached position of the price display terminals, the contact portion can be further subject to damage and the physical connection thereof can be inconvenient. Therefore, it is desirable to have a data control system where the data is transmitted from the store controller to the price display terminals by a wireless or a capacity coupling system to avoid the connection by physical contact. However, in this system, no power can be supplied from the outside. Accordingly, a power source, such as a battery, is provided to supply power to the price display terminals. Since several thousand price display terminals are often used in one system, when the life of the battery powering the individual price display terminals is short, the replacement of the batteries of price display terminals can be expensive and take much time and labor. Accordingly, the power consumption of each price display terminal should be minimized to increase the time between battery replacements.

Accordingly, it is desirable to provide a standby rest mode for the individual price display terminals in order to minimize the energy requirements and power consumption of the individual price display terminals, and thereby maximize battery life. This is accomplished in the present invention by periodically bringing each of the price display terminals into an enable mode after standby rest periods of a given duration. When the store controller is ready to begin data transmission, the store controller transmits a start of transmission signal which is longer than the price display terminals' standby rest periods to each of the price display terminals in order to notify each of the price display terminals of the start of data transmission. The start of transmission signal is longer than the price display terminals' standby rest period so each of the individual price display terminals are brought into the enable mode at least once during the transmission of the start of transmission signal. When the individual price display terminal receives the start of transmission signal, it cancels the next standby rest period and remains in its enable mode. In this manner, a data signal following the start of transmission signal is received by each of the individual price display terminals. The start of transmission signal preferably initiates transmission control means 8, transmission means 14 and the like for transmission from control unit 1 to the respective price display terminals 2.

Figure 4A:
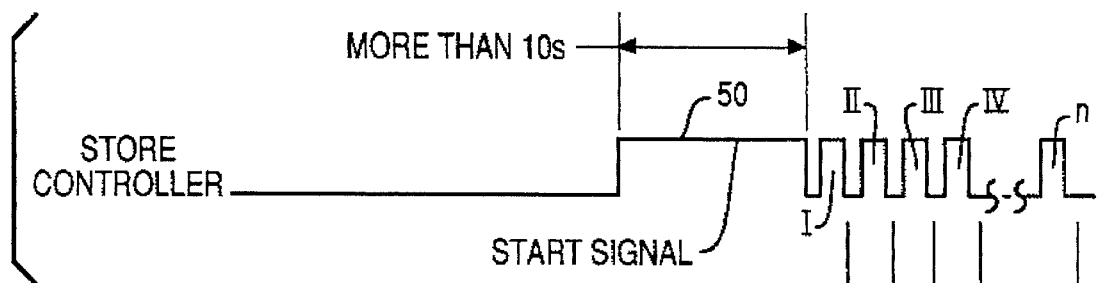
FIG. 4(a) and 4(b) are a timing diagram of the data transmission from the control unit to the price display terminals in accordance with the time-dependent data control system of the present invention.
Figure 4B:
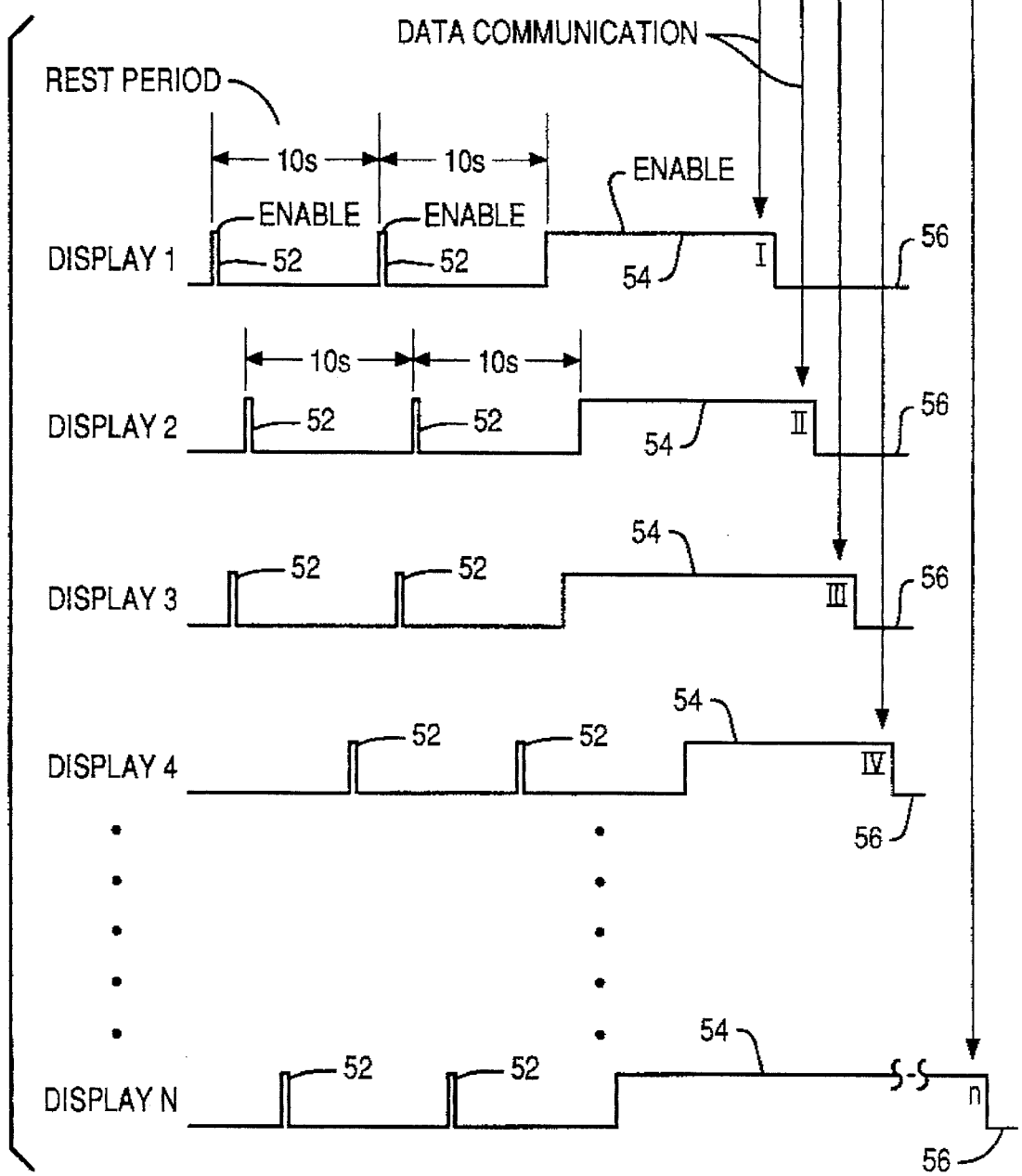

The receiving of data by price display terminal 2 will now be described. FIG. 3 illustrates a preferred embodiment of receiving section 16 of price display terminal 2. FIGS. 4(a) and 4(b) constitute a timing chart of the data transmission from the control unit 1 to each price display terminal 2. Receiving section 16 is brought into the enable state by reception allow signal 50 from reception allowing means 42 which is adapted to output reception allow signal 50 for a predetermined period of time at a given interval based on data from timer 44. In the case shown in FIG. 4(b), receiving section 16 is brought into enable mode 52 for 20 milliseconds at the interval of 10 seconds. Accordingly, the start of reception signal is preferably output from output unit 1 for an interval of 10 seconds or more.

As shown in FIG. 4(a), start of transmission signal 50 from output unit 1 lasts for 10 seconds or more, so receiving section 16 is brought into enable mode 52 at least one time during the transmission of start of transmission signal 50. Start of transmission signal 50 is then detected by start signal sensing means 40 as the start signal. When the start signal is detected, a detection signal is output to reception allowing means 42, which then receives the detection signal and sends an enable signal to receiving section 16 regardless of the state of timer 44. Enable period 54 is maintained until the reception of all data is finished or a predetermined condition is settled as shown in FIG. 4(b).

In the above mentioned manner, after all of the price display terminals connected to the store controller have been brought into the enable mode, the data such as "change time", "changed data" and "standard time" are transmitted together with a destination address (I, II, III, IV through n in FIG. 4(a)). Each of the price display terminals checks to see whether the data being transmitted is directed to that particular price display terminal in accordance with the destination address in order to receive only the data transmitted thereto (I, II, III, IV through n in enable periods 54 of the price display terminals 1 through N as shown in FIG. 4(b)).

Each price display terminal, when it receives the data transmitted thereto, releases the enable mode and returns to standby rest mode 56. The individual price display terminals then continue to be brought into enable mode 52 at intervals of 10 seconds. As an alternative, the price display terminals may be constructed such that all of the price displays maintain their enable periods 54 until the data transmission to all of the price display terminals is completed regardless of whether or not the data is being transmitted to that particular price display terminal. In this case, the price display terminals will return to standby rest mode 56 all together at the completion of data transmission to all of the price display terminals. Such an arrangement would be useful if, for example, the "standard time data" is transmitted to all of the price display terminals at the end of data transmission.

As has been described above, in accordance with the present invention, the changed data, the change time and the like are transmitted from a control unit to price display terminals prior to the time at which the changed data is to be displayed. The individual price display terminals change their displayed contents independently of each other at the change time transmitted from the control unit by means of clock means and change time confirming means present in each of the price display terminals. Thus, the data change timing is not influenced by the transmission speed of the communicating means. Accordingly, such an arrangement allows the displayed contents of price display terminals which are to be changed to be changed independently, yet all together at the change time.

In addition, the standard time is transmitted from the control unit to each of the price display terminals together with the change time and the changed data such that each of the price display terminals can adjust the time of its own clock means to set it to the standard time received. Therefore, each of the individual price display terminals can accurately change their displayed contents at the same time.

Furthermore, the price display terminals are designed to be brought into an enable mode for only a relatively short period of time in the given cycle, spending the remainder of time in a standby rest mode such that the life of the power source of a battery driven type of price display terminal can be increased.

Although the present invention has been described above in detail the same is by way of illustration and example only and is not to be taken as a limitation on the present invention. Accordingly, the scope and content of the present invention are to be defined only by the terms of the appended claims.

What is claimed is:

1. A time-dependent retail price display system, comprising:
   a central control unit for receiving input updated displayed retail price data and retail price change time data;
   a plurality of electronic retail price displays for displaying retail price data and receiving transmissions of updated displayed retail price data and retail price change time data from said central control unit;
   said plurality of electronic retail price displays being adapted to change displayed retail price data at a preset time based on said retail price change time data received from said central control unit;
   said central control unit including means for transmitting retail price change time data and updated displayed retail price data to said plurality of electronic retail price displays;
   said central control unit including transmission control means for controlling said means for transmitting retail price change time data and updated displayed retail price data;
   wherein said transmission control means starts said means for transmitting retail price change time data and updated displayed retail price data at a time no later than said preset time minus a communication time, wherein said communication time is a time required for transmitting retail price change time data and updated displayed retail price data to said plurality of electronic retail price displays; and
   said plurality of electronic retail price displays including clock means and means for confirming said retail price change time data transmitted by said central control unit by said clock means and changing said displayed retail price data to said updated displayed retail price data in response to updated displayed retail price data and retail price change time data received from said central control unit.

2. The time-dependent retail price display system in accordance with claim 1, wherein said central control unit includes clock means, said transmitting means being adapted to transmit time of its own clock means as reference time data simultaneously with the transmission of said updated displayed retail price data and said retail price change time data to each of said plurality of electronic retail price displays and each of said plurality of electronic retail price displays including time adjusting means for setting said clock means of its own by said reference time data received from said central control unit.

3. The time-dependent retail price display system in accordance with claim 1, wherein said transmitting means of said central control unit includes means for transmitting a start of transmittal signal of a predetermined length and each of said plurality of electronic retail price displays includes reception controlling means which enables in a cycle of a given period of time which is shorter than said given length of said start of transmission signal, said reception controlling means being brought to an enable state when said start of transmission signal is received and maintained in said enable state.

4. The time-dependent retail price display system in accordance with claim 2, wherein said transmitting means of said central control unit includes means for transmitting a start of transmission signal of a predetermined length and each of said plurality of electronic retail price displays includes reception controlling means which enables in a cycle of a given period of time which is shorter than said given length of said start of transmission signal, said reception controlling means being brought to an enable state when said start of transmission signal is received and maintained in said enable state.

5. A time-dependent retail price display system, comprising:
   a central control unit for receiving input updated retail price display data and retail price change time data and transmitting said updated retail price display data and retail price change time data;
   a plurality of electronic retail price displays for displaying retail price display data, said plurality of electronic retail price displays for receiving transmissions of updated retail price display and retail price change time data from said central control unit;
   said plurality of electronic retail price displays including clock means for clocking and outputting the current time, memory means for storing retail price change time data and updated retail price display data received from said central control unit and retail price display changing means for comparing data output from said clock means with said retail price change time data stored in said memory and changing said retail price display data which is being displayed to said updated retail price display data when said retail price change time has come; and
   said central control unit including transmission control means for controlling said transmitting said updated retail price display data and retail price change time data;
   wherein said transmission control means starts said transmitting updated retail price display data and retail price change time data at a time no later than said retail price change time minus a communication time, wherein said communication time is a time required for transmitting updated retail price display data and retail price change time data to said plurality of electronic retail price displays.

6. A method for changing the display of retail price data at one or more of a plurality of electronic retail price displays, comprising the steps of:
   generating a clock signal representing the current time at each of said plurality of electronic retail price displays;
   transmitting to each of said plurality of electronic retail price displays a data signal representing updated retail price display data and retail price change time data representing a change time at which said updated retail price display data is to be displayed;
   wherein said transmitting is controlled by a transmission control means in a central control unit and wherein said transmission control means starts said transmitting said data signal at a time no later than said change time minus a communication time, wherein said communication time is a time required for transmitting retail price change time data and updated and updated retail price display data to said plurality of electronic retail price displays;
   receiving at each of said plurality of electronic retail price displays said data signal;
   comparing, at each of said plurality of electronic retail price displays, the current time and said change time; and
   changing, at each of said plurality of electronic retail price displays, the displayed retail price data to the updated retail price display data when the current time reaches said change time.

7. A time-dependent system for updating retail price displays in varying locations throughout a store, comprising:

a plurality of electronic retail price displays for displaying retail price data, each of said plurality of displays having a clock means for generating a current time;

a central control unit including clock means for generating a standard time;

memory means for storing (i) updated price data and change time data, wherein said change time data represents a change time;

(ii) a predetermined order for transmitting said updated price data and change time data to said plurality of electronic retail price displays; and (iii) a communication time value representing the time required for transmitting updated price data and change time data to said plurality of electronic retail price displays according to said predetermined transmission order, transmission control means for controlling transmitting of said updated price data and said change time data, according to said predetermined transmission order, when said standard time plus said communication time value equals said change time; and said electronic displays receiving said updated price data and said change time data, comparing said change time and said current time, and changing displayed retail price data to said updated price data when said current time reaches said change time.

8. The system of claim 7 further comprising:

a wireless means for transmitting said updated price data and said change time data from said central control unit to said plurality of electronic displays.

9. The system of claim 7 further comprising:

a wireless communication channel for transmitting said updated price data and said change time data from said central control unit to said plurality of electronic displays.

10. The system of claim 7 further comprising:

means for transmitting said updated price data and said change time data from said central control unit to said plurality of electronic displays wherein said transmitting means operates without physically contacting electrical connectors on said central control unit and said plurality of electronic displays.

11. The system of claim 7 wherein said electronic displays are battery-powered.

12. A time-dependent wireless retail price display system, comprising:

a plurality of electronic retail price displays for displaying price data; and a central control unit for receiving updated price data and change time data, wherein said change time data indicates a change time;

said central control unit including wireless means for transmitting said updated price data and change time data to said plurality of electronic retail price displays;

said central control unit including transmission control means for controlling said means for transmitting said updated price data and change time data;

wherein said transmission control means starts said means for transmitting updated price data and change time data at a time no later than said change time minus a communication time, wherein said communication time is a time required for transmitting updated price data and change time data to said plurality of electronic retail price displays;

wherein said plurality of electronic retail price displays have a clock means, a memory means, a receiving means for receiving updated price data and change time data, means for comparing time as indicated by said clock means and said change time and means for changing displayed price data to said updated price data in response to said means for comparing.

13. The system of claim 12 wherein said wireless transmitting means operates without physically contacting electrical connectors on said control unit and said electronic displays.

14. The system of claim 12 wherein said central control unit further includes a memory means for storing a predetermined order of transmission wherein said wireless transmitting means transmits using said predetermined order.

15. The system of claim 12 wherein said electronic displays are battery-powered.

* * * * *